United States Patent [19]
Gehrmann, III et al.

[11] Patent Number: 5,199,377
[45] Date of Patent: Apr. 6, 1993

[54] ARTIFICIAL REEFS MANUFACTURED FROM COAL COMBUSTION BY-PRODUCTS

[75] Inventors: William H. Gehrmann, III; Charles E. Anderson, both of Sugar Land; Sammy M. Ray, Galveston; William B. Baker, Jr., Bacliff, all of Tex.

[73] Assignee: JTM Industries, Inc., Stafford, Tex.

[21] Appl. No.: 873,650

[22] Filed: Apr. 23, 1992

Related U.S. Application Data

[63] Continuation of Ser. No. 645,193, Jan. 24, 1991, abandoned.

[51] Int. Cl.$^5$ .............................................. A01K 61/00
[52] U.S. Cl. ..................................................... 119/4
[58] Field of Search .......................................... 119/3, 4

[56] References Cited

U.S. PATENT DOCUMENTS

| 3,572,292 | 3/1971 | Quayle et al. | 119/4 |
| 4,844,015 | 7/1989 | Garvey et al. | 119/4 |
| 4,996,943 | 3/1991 | Garvey et al. | 119/4 |

Primary Examiner—Gene Mancene
Assistant Examiner—Thomas Price
Attorney, Agent, or Firm—Pravel, Gambrell, Hewitt, Kimball & Krieger

[57] ABSTRACT

The invention provides an artificial cultch for mollusca formed of coal or lignite combustion by products (CCBP) such as fly ash and bottom ash with an optional binder, lime or Portland Cement. The cultches are hemispherical or round-shaped and may be randomly stacked in a reef with interstitial void spaces for mollusca growth. The invention also provides a method of mass-producing these cultches.

9 Claims, 1 Drawing Sheet

ARTIFICIAL REEFS MANUFACTURED FROM COAL COMBUSTION BY-PRODUCTS

This is a continuation of co-pending application Ser. No. 07/645,193 filed on Jan. 24, 1991, now abandoned.

FIELD OF THE INVENTION

The invention relates to oyster cultches, artificial reefs and processes for producing these for the cultivation of marine life, from coal combustion by-products such as fly ash, bottom ash, and flue-gas desulfurization sludge.

BACKGROUND OF THE INVENTION

Electric utilities using coal-fired power plants are often faced with the problem of disposing of increasingly large volumes of coal combustion by-products (CCBP). These CCBP include fly ash, bottom ash and flue-gas desulfurization sludge, which is a mixture of calcium sulfite/calcium sulphate.

Fly ash is a finely divided non-combustible residue which results from the burning of coal or lignite. Fly ash comprises silicon oxide, alumina, ferric oxides and calcium oxide. Fly ash is known to be a natural pozzolan, and sets up rapidly when combined with water. Bottom ash is a non-combustible granular material which falls to the bottom a furnace during coal or lignite combustion. Bottom ash is coarser than fly ash and ranges in size from a size approximating that of fine sand to coarse gravel. Hydrated fly ash and bottom ash mixtures have concrete-like properties which include high compressive strength and excellent weathering characteristics.

Given the large volumes of CCBP produced and the increasingly limited scope for disposing of this by-product in conventional land fills, there is an increasing need for utilities to find imaginative alternative to CCBP disposal. Consequently, the electric utilities have sought ways and means to use CCBP in, for example, the construction industry as an additive to concrete to produce light weight concrete.

At the same time that the utilities are faced with the problem of disposing of large quantities of CCBP, coastal development projects require a large amount of material for reef enhancement projects For example, the U.S. Corps of Engineers is currently, in 1991, involved in diverting the Colorado River near its mouth at Matagorda, Tex., back to its original course. This will allow the river to empty into Matagorda Bay. This project will require replacement of sufficient substrate to create 54 oyster reefs in Matagorda Bay. These reefs will use approximately one hundred thousand cubic yards of material. As a further example, the proposed deepening and widening of the Houston Ship Channel in Galveston Bay, Tex., if approved, would probably require the establishment of several hundred acres of oyster reef. It is also significant that increased fishing pressure off-shore has caused a decline in populations of important sport and commercial fish species. The Texas Parks and Wildlife Department has formed an Artificial Reef Advisory Committee in an effort to create new off-shore habitats for these declining fish populations.

Currently, oyster and clam shells are the most commonly used substrate for the creation and enhancement of reefs. These materials have historically been obtained by dredging buried shell deposits. However, this source of supply is rapidly declining and therefore becoming more costly. Furthermore, the dredging of shell deposits is currently strictly forbidden in Texas waters. Coastal states are now seeking alternative reef substrate materials.

SUMMARY OF THE INVENTION

The invention provides a cultch for mollusca, more specifically, an oyster cultch formed of coal combustion by-products (CCBP) that is suitable for forming reefs which will attract and support oyster spat. The invention also provides a process for producing the invention oyster cultch useful for forming the artificial reef. Thus, the invention utilizes a by-product, (CCBP), to produce a substrate that is eminently suitable for the production of artificial reefs.

The invention oyster cultch is formed of fly ash, or a mixture of fly ash and bottom ash. Since both fly ash and bottom ash are natural pozzolans, a binder is often not needed to form a cultch having the compressive strength necessary for prolonged undersea use as reef substrate material, namely about 300 psi. However, since fly ash and bottom ash vary widely in composition depending upon the source (the coal or lignite burned) these ashes have varying pozzolanic properties. Therefore, it is often necessary to add a binder, such as portland cement, lime or a synthetic resin in a sufficient quantity to enable the production of a cultch having the desired compressive strength.

While prior art oyster cultches have, with a few exceptions, tended towards imitating the natural shape of the oyster shell, the invention oyster cultch is preferably rounded or elliptical in shape. This shape allows the cultch to be placed in the designated area on the ocean floor by off loading from a barge to settle randomly upon the ocean floor to form heaps or reefs that will allow movement of water into the interstitial void spaces between the individual cultches. Thus, oyster spat, which are photo-sensitive and seek to avoid light, can cling to the darker voids, inside the interstitial spaces in the artificial reef, and grow and develop in these void spaces. To avoid the clogging of these spaces, with resultant loss of water circulation and nutrients supply to the oysters, the individual cultches should be no less than from about 1 to about 3 inches in diameter, or other specified dimension.

The invention process for producing the invention oyster cultch, includes mixing fly ash, or fly ash and bottom ash, with water and optionally a binder such as portland cement or lime. This mixture is then fed to a rotating pan which makes rounded-shaped pellets of the mixture These pellets are then expelled into a collection system where the pellets are allowed to "cure." The cured round-shaped pellets or cultches are then suitable for use as the individual components of an artificial reef.

The invention oyster cultch, reefs of these cultches, and process for producing the cultch provide a viable substitute for the dwindling supplies of natural oyster and clam shells needed to form reefs in marine environments, and provide an alternative to disposal of CCBP.

DETAILED DESCRIPTION OF THE PREFERRED EMBODIMENTS

The invention provides a unique mollusca cultch, more specifically an oyster cultch, the reefs made from this cultch and an efficient process for mass producing the cultch. The cultch is formed of fly ash, or a mixture of fly ash and bottom ash, and optionally a binder such as lime or cement and the like. Since the composition of fly ash will vary considerably, depending upon the type of coal or lignite burned to produce it, the quantities of the various constituents of the cultch composition will also vary. Thus, if the fly ash or bottom ash is strongly pozzolanic and sets up readily into a hardened mass upon addition of water, then a binder may not be needed. On the other hand, if the pozzolanic properties of these CCBP materials are not strong, then an amount of binder to produce a cultch composition capable of withstanding typical pressures encountered in use, must be added.

It is possible, using an ASTM Class C fly ash or a fly ash produced by fluidized bed combustion to form the cultch from fly ash only. However, bottom ash being coarser, gives a grainy texture to the cultch which may allow oyster spat a better gripping surface for clinging.

Given the variation in properties of fly ash and bottom ash (depending upon the coal or lignite source) an optimum range of amounts of each of these constituents should desirably be determined for each fly ash/bottom ash type. Notwithstanding this desirability for testing, the fly ash content may range from about 15 to about 40 weight percent of the cultch composition preferably about 15 to about 25 weight percent; the bottom ash from about 0 to about 70 weight percent preferably from about 50 to about 70 weight percent; the binder, if it is portland cement, from about 0 to about 15 weight percent preferably 0 to about 5 weight percent; and if it is lime, from about 0 to about 15 weight percent preferably 0 to about 5 weight percent. Further, to form the cultch, it is necessary to add water, in the amount from about 10 to about 30 weight percent to the dry ingredients to allow the pozzolanic reactions to take place and produce the hardened cultch. (All weight percentages are based on the total weight of the reactants, i.e. fly ash, bottom ash, binder, and water).

Figure 1:
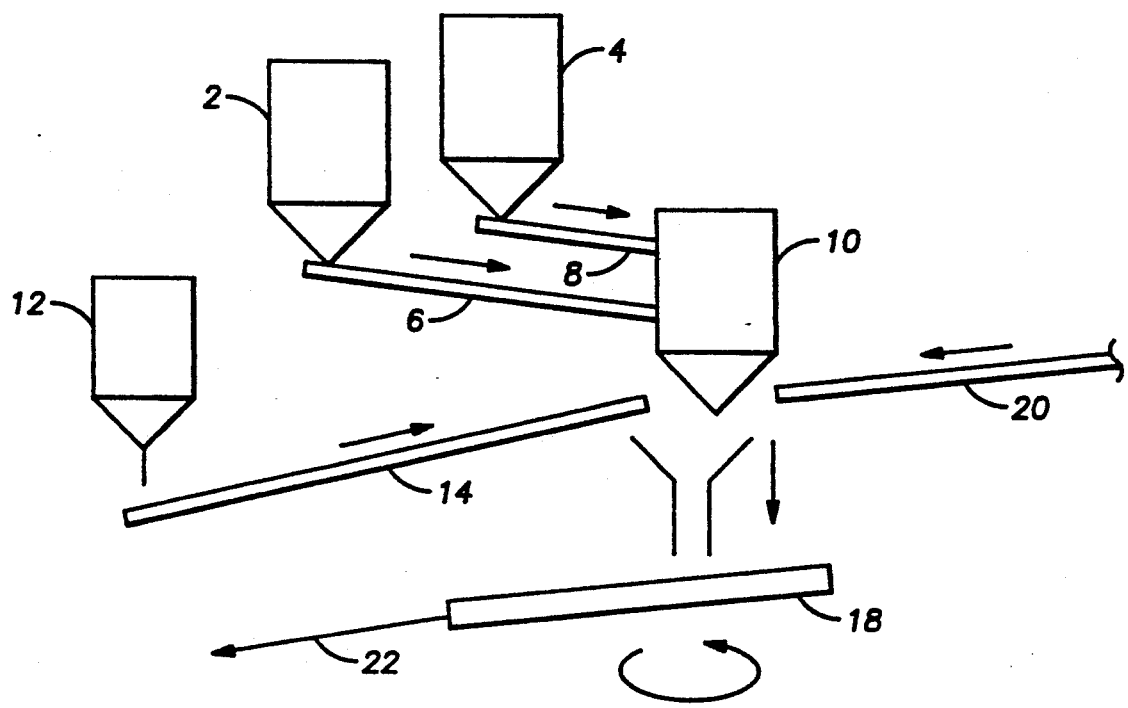
FIG. 1 is a schematic process flow diagram.
Figure 2:
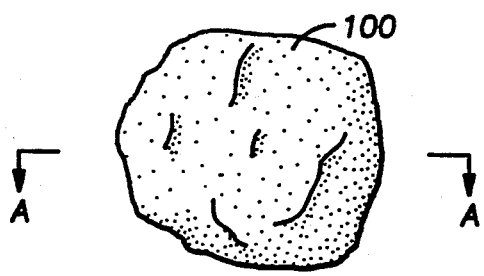
FIG. 2 is a drawing of a typical invention cultch.

While there are several methods for producing the invention of cultch as shown in FIG. 2, the preferred process is illustrated systematically in FIG. 1. In this process the cultch constituents are mixed together and poured into a rotating pan which is mounted at an angle, Θ, to the horizontal. The rotation of the pan produces rounded balls of the charged material. The size of these balls may be controlled by adjusting the angle of the rotating pans and the speed of pan rotation.

More particularly, with reference to FIG. 1, fly ash and bottom ash are loaded into separate silos or bins, 2 and 4, respectively. A preselected quantity of each of fly ash and bottom ash is then fed to mixing silo 10 via transport means such as conveyor belts or screw feeders 6 and 8. Optionally, a binder such as cement or lime, and the like, is loaded into binder silo 12 and fed, via transport means such as conveyor belt or screw feeder 14 to the opening of feed funnel 16. Here the binder, fly ash, and bottom ash are combined with a preselected amount of water. Water is added via pipeline 20 which may be fitted with a spray nozzle. The total mixture of fly ash, bottom ash, binder and water is then charged to rotating pan 18 which is mounted at an angle feeder to the horizontal. The speed of rotation and size of angle Θ will determine the size of the rounded pellets produced. Thus, to produce larger round pellets, of the shape shown in FIG. 2, for a given speed, the angle Θ is reduced. Conversely, to increase the size of the pellets, the size of angle Θ is increased. Thus, to produce rounded pellets of about 3 inches in diameter, an angle Θ of about 45° is required at a pan speed of 23 rpm when a 4' diameter pan is used. At the same speed of rotation and angle of 60°, about 1" diameter pellets are produced. Other combinations of speed of rotation and angle Θ may also yield these size distributions the formed, ball-shaped pellets then exit from the rotating pan 18 in direction 22.

Figure 3:
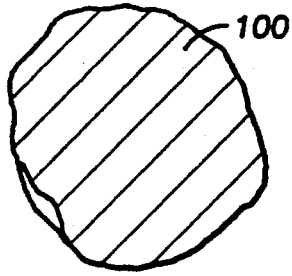
FIG. 3 is a cross-sectional view of the cultch of FIG. 4.
Figure 4:
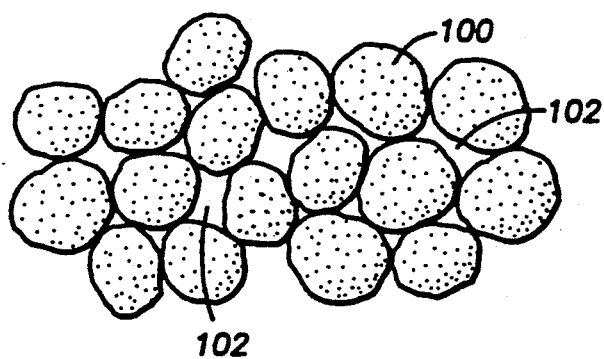
FIG. 4 shows a stacking of a plurality of cultches as may be found in an artificial reef of the cultches.

The cultches 100 produced by this process are shown in FIGS. 2, 3 and 4. FIG. 2 shows the generally rounded pellet-shaped cultch 100 while FIG. 3 shows a cross-section of the cultch 100 along a diameter A—A. FIG. 4 shows a plurality of cultches 100 stacked one atop the other, as they would occur in an artificial reef, with interstitial spaces 102 (only two of which are labeled) wherein oyster spat may adhered, grow and develop until ready for harvesting.

Tests have been conducted to ascertain the compressive strength and attractive properties of the artificial oyster cultches. Further, trace heavy metal analyses have been carried out on oyster spat grown on the artificial cultches. The results of these tests are illustrated in the following examples which do not limit the scope of the invention as described above and claimed herebelow.

EXAMPLE 1

Compressive Strength Testing

Samples of fly ash and bottom ash were obtained from the W. A. Parish Generating Station in Thompson, Tex. The fly ash was Class C (ASTM C618-89) with a grain size less than 0.02 mm for 95–100% of the ash. The bottom ash ranged in size from fine sand size to coarse gravel size.

The constituents shown in Table 1 were blended in a 0.25 $m^3$ cement mixer for 4–6 minutes, until thoroughly mixed. The mixture produced was then poured into forms made from 4" lengths of 4" diameter PVC pipe. The mixes in the forms were tapped to remove air, then covered with cotton cloth for curing.

Nine separate mixes, shown in Table 1, were prepared using varying quantities of bottom ash. After curing for about 14 days, three samples of each mix were tested for compressive strength according to ASTM C-39. The results, shown in Table 2, indicate that mixes A1, A3, B3 and C3 met the minimum 300 psi compressive strength needed to survive handling, transportation, reef placement and long term salt-water immersion.

Samples of these 4 mixes (A1, A3, B3 and C3) were then submerged for 7, 30, 90, 180 and 365 days and tested for compressive strength.

Results, shown in Table 3, indicate a gain in strength with time of immersion.

EXAMPLE 2

Substitution of W. A. Parish bottom ash with Limestone Electric Generating Station, Jewett, Tex. (LGS) bottom ash:

Samples were prepared using mix constituents shown in Table 4 and these were tested for compressive strength after about 14 days (0 time in water, in Table 5). The samples were then immersed in water, as in Example 1, and compressive strengths measured at 30 and 90 days as shown in FIG. 5.

EXAMPLE 3

Three samples of each mix A1, A3, B3 and C3, (shown in Table 1) and oyster shell controls were exposed to hatchery-reared oyster larvae for 24-28 hours to determine the CCBP cultch substrate's suitability as a cultch for oyster setting. Spat were counted at weekly intervals until they reached 1 inch in length (about 8 weeks). The number of spat attaching to cylinders or broken cylinders of the CCBP substrate are compared with the numbers that attached to natural oyster shell in Table 6.

EXAMPLE 4

Oysters were grown at 3 different locations on both natural oyster shell and the invention CCBP-based cultches. Samples of these oysters were harvested at the prespawn, postspawn and depuration conditions and analyzed for trace heavy metals. The results are shown in Table 7. Using the Student's T-test, only 7 oyster samples had a trace heavy metal element content significantly higher than the natural shell-grown oyster at the $\alpha=0.05$ level. Similarity in the trace heavy metal concentrations between the shell-grown and CCBP cultch-grown oysters suggest that the oyster heavy metal content is a function of water or sediment environment rather than cultch substrate.

The invention has been described, with reference to its preferred embodiments. A person having ordinary skill in the art, upon reading this description will appreciate changes and modifications that are within the scope and spirit of the invention as described above and claimed herebelow.

TABLE 1

| Mix Components | 1:1 Ratios ("A" Series) | | |
|---|---|---|---|
| | Batch No. 1 (A1) | Batch No. 2 (A2) | Batch No. 3 (A3) |
| Fly Ash | 42.18% | 39.07% | 40.04% |
| Bottom Ash | 42.07% | 39.3% | 40.04% |
| Hydrated Lime | 5.04% | 2.3% | 0.0% |
| Portland Cement | 0.0% | 2.3% | 4.81% |
| Water | 10.71% | 17.0% | 15.11% |

| Mix Components | 2:1 Ratios ("B" Series) | | |
|---|---|---|---|
| | Batch No. 1 (B1) | Batch No. 2 (B2) | Batch No. 3 (B3) |
| Fly Ash | 49.30% | 50.00% | 49.01% |
| Bottom Ash | 24.46% | 25.00% | 25.76% |
| Hydrated Lime | 4.41% | 2.2% | 0.0% |
| Portland Cement | 0.0% | 2.2% | 4.49% |
| Water | 21.83% | 20.4% | 20.74% |

| Mix Components | 1:2 Ratios ("C" Series) | | |
|---|---|---|---|
| | Batch No. 1 (C1) | Batch No. 2 (C2) | Batch No. 3 (C3) |
| Fly Ash | 26.76% | 26.59% | 26.99% |
| Bottom Ash | 51.55% | 51.73% | 52.64% |
| Hydrated Lime | 4.70% | 2.35% | 0.0% |
| Portland Cement | 0.0% | 2.36% | 4.78% |
| Water | 16.99% | 16.98% | 15.59% |

TABLE 2

| Compressive Strength (psi) Mix Batch | | | | | | | | | |
|---|---|---|---|---|---|---|---|---|
| A1 | A2 | A3 | B1 | B2 | B3 | C1 | C2 | C3 |
| 565 | 220 | 730 | 195 | 130 | 400 | 200 | 245 | 550 |
| 555 | 210 | 710 | 195 | 135 | 350 | 200 | 250 | 550 |
| 580 | 215 | 690 | 190 | 130 | 420 | 195 | 230 | 545 |

TABLE 3

| Time In Water | Compressive Strength (psi) | Avg. Comp Strength (psi) | Avg. Strength Gain |
|---|---|---|---|
| A1 Mix | | | |
| 0 Days | 565 / 555 / 580 | 567 | — |
| 7 Days | 915 / 940 / 925 | 927 | 63.5% |
| 30 Days | 1585 / 1615 / 1700 | 1633 | 188% |
| 90 Days | 2320 / 2355 / 2595 | 2423 | 327.3% |
| 180 Days | 2420 / 2420 / 2595 | 2438 | 337% |
| 365 Days | 3185 / 2905 / 3080 | 3057 | 439.2% |
| A3 Mix | | | |
| 0 Days | 730 / 710 / 690 | 710 | — |
| 7 Days | 1165 / 1190 / 1230 | 1195 | 68.3% |
| 30 Days | 1975 / 1940 / 1955 | 1957 | 175.6% |
| 90 Days | 3700 / 3475 / 3200 | 3458 | 387.1% |
| 180 Days | — / 2630 / 2215 | 2423 | 241.3% |
| 365 Days | 3325 / 3335 / 3595 | 3418 | 381.4% |
| B3 Mix | | | |
| 0 Days | 400 / 350 / 420 | 390 | — |
| 7 Days | 500 / 480 | 490 | 25.6% |
| 30 Days | 1200 / 1165 | 1182 | 203.1% |
| 90 Days | 1525 / 1695 | 1610 | 312.8% |
| 180 Days | 1525 / 1555 | 1540 | 294.9% |
| 365 Days | 2860 / 3460 | 3160 | 710.3% |
| C3 Mix | | | |
| 0 Days | 550 / 550 / 545 | 548 | — |
| 7 Days | 985 / 1155 / 1020 | 1053 | 92.1% |
| 30 Days | 1780 / 1650 / 1565 | 1665 | 203.8% |
| 90 Days | 2425 / 2250 / 2075 | 2250 | 310.6% |
| 180 Days | 2285 / 1975 / 2355 | 2205 | 302.4% |
| 365 Days | 2840 | 2942 | 436.9% |

TABLE 3-continued

| Time In Water | Compressive Strength (psi) | Avg. Comp Strength (psi) | Avg. Strength Gain |
|---|---|---|---|
| | 2872 | | |
| | 3115 | | |

TABLE 4

Mix Components

| WAP Fly Ash and WAP Bottom Ash - (CA1) | |
|---|---|
| Fly Ash | 20.77% |
| Bottom Ash | 58.75% |
| Portland Cement | 4.68% |
| Water | 15.80% |

| WAP Fly Ash and LGS Bottom Ash - (LMS) | |
|---|---|
| Fly Ash | 22.60% |
| Bottom Ash | 53.35% |
| Portland Cement | 4.60% |
| Water | 19.45% |

TABLE 5

| Time In Water | Compressive Strength (psi) | Avg. Comp Strength (psi) | Avg. Strength Gain |
|---|---|---|---|
| WAP Fly Ash and WAP Bottom Ash - (CA1) | | | |
| 0 Days | 470 | 468 | — |
| | 460 | | |
| | 475 | | |
| 30 Days | 1488 | 1384 | 195.7% |
| | 1523 | | |
| | 1142 | | |
| 90 Days | 1555 | 1617 | 245.5% |
| | 1705 | | |
| | 1590 | | |
| WAP Fly Ash and LGS Bottom Ash - (LMS) | | | |
| 0 Days | 350 | 355 | — |
| | 400 | | |
| | 315 | | |
| 30 Days | 2215 | 2042 | 475.2% |
| | 2250 | | |
| | 1660 | | |
| 90 Days | 3875 | 3587 | 910.4% |
| | 3770 | | |
| | 3115 | | |

TABLE 6

Comparison of Number of Oyster Spat on CCBP Mix Cultches And Oyster Shell Control

| Cultch | Design | Range | Mean | St. Dev. |
|---|---|---|---|---|
| A1 | Cylinder | 280–865 | 513.3 | 309.9 |
| | Broken | 159–234 | 193.3 | 37.9 |
| A3 | Cylinder | 294–735 | 490.7 | 224.3 |
| | Broken | 128–502 | 317.7 | 187.1 |
| B3 | Cylinder | 167–314 | 360.3 | 81.1 |
| | Broken | 224–281 | 245.3 | 31.1 |
| C3 | Cylinder | 289–827 | 576.7 | 335.2 |
| | Broken | 118–511 | 369.7 | 247.4 |
| Control | Cylinder | — | — | — |
| | Broken | 64–2756 | 829.3 | 1030.6 |

TABLE 7

Trace Element Concentration

Trace Element Concentrations (PPM) For Oysters Grown on CCBP and Oyster Shell Substrates Under Prespawn, Postspawn and Depuration Conditions At Three Deployment Sites

| Location | Substrate | Cr | Mn | Cu | Zn | As | Se | Sn | Ba | Hg | Pb |
|---|---|---|---|---|---|---|---|---|---|---|---|
| PRESPAWN | | | | | | | | | | | |
| Cedar Bayou | CCBP | 2.76 | 35.09 | 243.70 | 3069 | 5.75 | 5.13 | 0.49 | 3.62* | 0.16 | 0.92 |
| | CTL | 2.10 | 19.77 | 226.90 | 3033 | 4.60 | 3.77 | 0.31 | 1.89 | 0.14 | 0.68 |
| Smith Point | CCBP | 3.41 | 28.18 | 339.60 | 4968 | 7.66 | 3.34 | 0.20 | 4.90 | 0.16 | 0.81 |
| | CTL | 3.30 | 32.38 | 314.10 | 4791 | 7.59 | 3.34 | 0.12 | 3.18 | 0.17 | 0.73 |
| Offatt's Bayou | CCBP | 2.68 | 31.94 | 98.00 | 2416 | 9.49 | 4.04 | 0.73 | 1.73 | 0.10* | 0.94 |
| | CTL | 2.35 | 31.94 | 103.20 | 2786* | 8.38 | 3.37 | 0.65 | 1.43 | 0.03 | 0.91 |
| POSTSPAWN | | | | | | | | | | | |
| Cedar Bayou | CCBP | 2.85 | 40.33 | 52.35 | 1680 | 12.97 | 4.63 | 0.23 | 2.01 | 0.11 | 0.76 |
| | CTL | 2.35 | 28.44 | 48.36 | 1551 | 10.74 | 4.15 | 0.21 | 1.67 | 0.06 | 0.73 |
| Smith Point | CCBP | 2.04 | 46.98* | 57.68 | 1806 | 11.95 | 4.58 | 0.23 | 2.48 | 0.11 | 0.92 |
| | CTL | 2.73* | 36.27 | 64.29 | 1793 | 12.53 | 4.67 | 0.22 | 2.07 | 0.08 | 0.88 |
| Offatt's Bayou | CCBP | 2.09 | 36.48 | 34.64 | 1167 | 10.88 | 4.17 | 0.36 | 2.94 | 0.23 | 0.85 |
| | CTL | 2.23 | 40.58 | 31.92 | 1026 | 9.75 | 2.91 | 0.24 | 2.52 | 0.11 | 0.84 |
| DEPURATION | | | | | | | | | | | |
| Cedar Bayou | CCBP | — | — | — | — | — | — | — | — | — | — |
| | CTL | — | — | — | — | — | — | — | — | — | — |
| Smith Point | CCBP | 1.86 | 16.48 | 241.20 | 4006 | 6.64 | 2.34 | 0.49 | 1.28 | 0.34* | 0.43 |
| | CTL | 1.96 | 11.40 | 261.20 | 4004 | 7.97 | 2.90 | 0.42 | 1.14 | 0.16 | 0.42 |
| Offatt's Bayou | CCBP | 6.81* | 10.16 | 109.75 | 3352 | 7.91 | 2.66 | 0.61 | 1.11* | 0.14 | 0.66 |
| | CTL | 1.59 | 8.30 | 116.10 | 3270 | 6.79 | 2.51 | 0.48 | 0.57 | 0.07 | 0.50 |

*An asterisk denotes a statistically significant difference in trace element concentrations.

We claim:

1. A cultch for mollusca said cultch being in the shape of a rounded pellet and formed of a composition comprising:
   a coal or lignite combustion byproduct selected from the group consisting of fly ash and bottom ash; and optionally, a binder selected from the group consisting of Portland cement and lime,
   wherein the cultch is in the shape of pellets such that when a plurality of cultches are randomly stacked, as in an article reef, then interstitial void spaces created by the random stacking are sufficiently large to allow the development of oyster spat to oysters in the spaces by allowing circulation of water and nutrients through the spaces.

2. The cultch of claim 1 wherein the diameter of the cultch is from about 2 to about 3 inches.

3. The cultch of claim 1 wherein the diameter of the cultch is greater than about 3 inches.

4. An artificial reef comprising round, pellet-shaped cultches randomly stacked to provide interstitial void spaces, water and nutrients for oysters being able to circulate through said space, said cultches comprising:
   a coal or lignite combustion byproduct selected from the group consisting of fly ash and bottom ash; and optionally, a binder selected from the group consisting of Portland Cement and lime wherein the size of the randomly stacked cultches creates void spaces in the reef of sufficient size to allow the development of oyster spat to oysters in the spaces.

5. The artificial reef of claim 4 wherein the diameter of the cultch is from about 2 to about 3 inches.

6. The artificial reef of claim 4 wherein the diameter of the cultch is greater than about 3 inches.

7. A process for producing round pellet-shaped cultches comprising:

mixing coal or lignite combustion byproducts selected from fly ash and bottom ash, and optionally a binder selected from lime and Portland Cement, with a sufficient quantity of water to allow the mixture to hydrate;

pouring the mixture onto a rotating surface inclined at an angle to the horizontal;

forming the poured mixture into rounded pellets by the rotating of the inclined surface;

allowing the rounded-shaped pellets to roll from the rotating surface; and curing the rounded-shaped pellets to hardness.

8. The process of claim 7 wherein the rounded-shaped pellets are greater than about 2 inches in diameter.

9. The process of claim 8 wherein the rounded-shaped pellets are less than about 3 inches in diameter.

* * * * *